US011573565B2

(12) United States Patent
Adwan

(10) Patent No.: US 11,573,565 B2
(45) Date of Patent: Feb. 7, 2023

(54) CONTROLLER FOR AN UNMANNED AERIAL VEHICLE

(71) Applicant: JAGUAR LAND ROVER LIMITED, Coventry (GB)

(72) Inventor: Adam Hussein Adwan, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 574 days.

(21) Appl. No.: 16/057,343

(22) Filed: Aug. 7, 2018

(65) Prior Publication Data

US 2019/0064797 A1  Feb. 28, 2019

(30) Foreign Application Priority Data

Aug. 30, 2017  (GB) .................. 1713849.6

(51) Int. Cl.
*G08G 5/00* (2006.01)
*G05D 1/00* (2006.01)
(Continued)

(52) U.S. Cl.
CPC ......... *G05D 1/0033* (2013.01); *B64C 39/024* (2013.01); *G05D 1/0094* (2013.01);
(Continued)

(58) Field of Classification Search
CPC ............ G08G 5/0069; B46C 2201/123; B46C 2201/146; B46C 39/02; B46C 39/24; G05D 1/0094; G05D 1/104; G06K 9/0067
(Continued)

(56) References Cited

U.S. PATENT DOCUMENTS 8,260,485 B1 *  9/2012  Meuth .................... G06Q 10/04
                                                                   701/26
9,752,878 B2 *  9/2017  Magson ................ B64C 39/024
(Continued)

FOREIGN PATENT DOCUMENTS

CA          2832956 A1     10/2012
WO    WO-2017139282 A1 *  8/2017  ........... B64C 39/024

OTHER PUBLICATIONS

Beyond Visual Line of Sight UAV Control for Remote Monitoring Using Directional Antennas; Songwei Li;Yixin Gu;Bishrut Subedi; Chenyuan He;Yan Wan;Atsuko Miyaji;Teruo Higashino; 2019 IEEE Globecom Workshops (GC Wkshps); IEEE Conference Paper. (Year: 2019).*
(Continued)

*Primary Examiner* — Cuong H Nguyen
(74) *Attorney, Agent, or Firm* — McCoy Russell LLP

(57) ABSTRACT

A controller for an unmanned aerial vehicle (UAV) comprising an image capture means, the controller comprising: inputs arranged to receive: positional data relating to the UAV, a vehicle and a user device; image data captured by the image capture means; a processor arranged to process the received positional data to determine the relative locations of the UAV, vehicle and user device; an output arranged to output a control signal for controlling the UAV and to output an image signal comprising captured image data; wherein the processor is arranged to: generate the control signal for the UAV such that the image data captured by the image capture means comprises at least an image of an obscured portion of the vehicle that is obscured from a field of view of a user of the user device.

18 Claims, 6 Drawing Sheets

(51) Int. Cl.
  *G05D 1/10*      (2006.01)
  *B64C 39/02*     (2023.01)
  *G06T 7/70*      (2017.01)

(52) U.S. Cl.
  CPC ............ *G05D 1/101* (2013.01); *G06T 7/70* (2017.01); *B64C 2201/127* (2013.01); *B64C 2201/145* (2013.01); *G05D 2201/0213* (2013.01); *G06T 2207/30252* (2013.01)

(58) Field of Classification Search
  USPC .............................................. 701/2; 382/103
  See application file for complete search history.

(56) References Cited

U.S. PATENT DOCUMENTS

| | | | | |
|---|---|---|---|---|
| 10,917,579 | B2* | 2/2021 | Babcock | B64C 39/024 |
| 11,192,647 | B2* | 12/2021 | Sergison | B64C 39/024 |
| 2004/0105090 | A1* | 6/2004 | Schultz | G06T 7/60 |
| | | | | 356/141.5 |
| 2013/0278631 | A1* | 10/2013 | Border | G02C 5/143 |
| | | | | 345/633 |
| 2014/0375493 | A1* | 12/2014 | Weisenburger | G06T 7/277 |
| | | | | 342/357.3 |
| 2015/0185025 | A1* | 7/2015 | Lacaze | G01C 21/28 |
| | | | | 701/451 |
| 2015/0363717 | A1* | 12/2015 | Lim | G06Q 10/10 |
| | | | | 705/4 |
| 2016/0313736 | A1* | 10/2016 | Schultz | G08G 5/0039 |
| 2016/0253808 | A1 | 11/2016 | Zounes | |
| 2017/0055433 | A1* | 3/2017 | Jamison | G05D 1/104 |
| 2017/0336806 | A1* | 11/2017 | Blanc-Paques | G01R 29/085 |
| 2019/0064797 | A1* | 2/2019 | Adwan | G05D 1/0033 |
| 2020/0346781 | A1* | 11/2020 | Bosma | B67D 7/04 |
| 2020/0409366 | A1* | 12/2020 | Schneider | G05D 1/12 |

OTHER PUBLICATIONS

Providing accountability and liability protection for UAV operations beyond visual line of sight; J. Yapp;R. Seker;R. Babiceanu; 2018 IEEE Aerospace Conference, IEEE Conference Paper. (Year: 2018).*
A Cost-Benefit Analysis to Achieve Command and Control (C2) Link Connectivity for Beyond Visual Line of Sight (BVLOS); Operations; Chen Zhong et al.; 2020 Integrated Communications Navigation and Surveillance Conference (ICNS); IEEE Conference Paper. (Year: 2020).*
Increasing Acceptance of Haptic Feedback in UAV Teleoperation by Visualizing Force Fields; Victor Ho;Clark Borst;Marinus M. van Paassen;Max Mulder; 2018 IEEE International Conference on Systems, Man, and Cybernetics (SMC); IEEE Conference Paper. (Year: 2018).*
H. C. Oliveira et al., Height Gradient Approach for Occlusion Detection in UAV Imagery, The International Archives of the Photogrammetry, Remote Sensing and Spatial Information Sciences, vol. XL-1/W4, 2015 Inter.Conf. on Unmanned Aerial Vehicles in Geomatics, Aug. 30-Sep. 2, 2015, Toronto, Canada (Year 2015).*
Application and capabilities of lidar from small UAV; by M. Tulldahl et al. spiedigitallibrary.org; Proceedings vol. 9832, Laser Radar Technology and Applications XXI; 98320V https://doi.org/10.1117/12.2224258 (Year: 2016).*
A. M. Samad, N. Kamarulzaman, M. A. Hamdani, T. A. Mastor and K. A. Hashim, "The potential of Unmanned Aerial Vehicle (UAV) for civilian and mapping application," 2013 IEEE 3rd International Conference on System Engineering and Technology, 2013, pp. 313-318, doi: 10.1109/ICSEngT.2013.6650191 (Year: 2013).*

* cited by examiner

CONTROLLER FOR AN UNMANNED AERIAL VEHICLE

CROSS REFERENCE TO RELATED APPLICATION

This application claims priority to and the benefit of GB1713849.6, filed Aug. 30, 2017, which is incorporated herein by reference in its entirety.

TECHNICAL FIELD

The present disclosure relates to a controller for an unmanned aerial vehicle and particularly, but not exclusively, to a controller for a drone. Aspects of the invention relate to a controller, to an unmanned aerial vehicle, to a remote control device, a user device, to a vehicle and to a method of controlling an unmanned aerial vehicle.

BACKGROUND

In certain circumstances vehicle users face challenging environments in which to manoeuvre their vehicle, for example, during parking manoeuvres or while negotiating challenging terrain. A known remote control system, as shown in FIG. 1, enables the vehicle user 10 to control the steering, braking and throttle systems of a vehicle 20 from a control device 30 such as a smartphone. This remote control device thereby enables the vehicle user to check the precise positioning of the vehicle during such manoeuvres by walking around the vehicle being remote controlled. As a consequence of using such a remote control system the chances of the vehicle experiencing a collision or damage may be reduced compared to a vehicle that is controlled by a vehicle user using the traditional control systems.

In some environments however the vehicle user may need to monitor the surroundings of the vehicle from a number of viewpoints simultaneously.

It is an aim of the present invention to address disadvantages associated with the prior art.

SUMMARY OF THE INVENTION

According to an aspect of the present invention there is provided a controller for an unmanned aerial vehicle (UAV) comprising an image capture means, the controller comprising: inputs arranged to receive: positional data relating to the UAV, a vehicle and a user device; image data captured by the image capture means; a processor arranged to process the received positional data to determine the relative locations of the UAV, vehicle and user device; an output arranged to output a control signal for controlling the UAV and to output an image signal comprising captured image data; wherein the processor is arranged to: generate the control signal for the UAV such that the image data captured by the image capture means comprises at least an image of an obscured portion of the vehicle that is obscured from a field of view of a user of the user device.

The present invention provides a controller for controlling an unmanned aerial vehicle (UAV) or drone relative to a vehicle and a user device, the user device representing the location of a user (e.g. user carries the user device). In order to control a vehicle and ensure that the vehicle is clear from obstacles during its manoeuvre the controller is arranged to control a drone equipped with a camera and to obtain images of obscured portions of the vehicle for display to the user.

Optionally, the processor is arranged to determine obscured portions of the vehicle that are obscured from the field of view of the user of the user device in dependence on the determined relative location of the vehicle and the user device. Optionally, positional data comprises GPS data. Positional data may comprise differential GPS data.

Optionally, UAV positional data comprises data from an inertial navigation system on the UAV. It is noted that the UAV may be launched from the vehicle (or a known location on the vehicle) such that the origin point of the UAV flightpath is known to the controller. The processor may be arranged to use positional data from the UAV inertial navigation system to correct GPS positioning errors.

Optionally, positional data comprises time of flight measurement data between one or more of: the UAV/vehicle; the UAV/user device; vehicle/user device. Time of flight (ToF) measurement data may be used by the processor to correct GPS position errors. The ToF measurement data may be obtained from a Bluetooth® based time of flight system or an ultra-wideband (UWB) based time of flight system.

The inputs may be arranged to receive vehicle sensor data and the processor may be arranged to determine relative locations of the UAV, vehicle and user or user device from the vehicle sensor data and time of flight measurement data.

Optionally, the processor is arranged to determine relative locations of the UAV, vehicle and user or user device using a simultaneous localisation and mapping (SLAM) algorithm.

Optionally, the positional data received at the inputs comprises data from a vehicle entry system, such as a passive entry passive start (PEPS) or enhanced passive entry passive start (ePEPS) system.

The processor may be arranged to use an image recognition algorithm to determine the relative location of the vehicle user and vehicle from image data received from the image capture means. It is noted that the processor may be arranged to directly recognise the vehicle user or alternatively determine the position of the user device and use the user device position as a proxy for the vehicle user position.

The processor may be arranged to generate a control signal to control the UAV position such that the image capture means is directed toward at least some of the obscured portions of the vehicle that are obscured from the line of sight of the vehicle user. In such an arrangement the image capture means may maintain a fixed position relative to the UAV that it is mounted on (or the image capture means may be unable to change its position relative to the UAV that it is mounted on) and the control signal may be arranged to move the UAV in order to effectively change field of view of the image capture means.

The processor may be arranged to generate a control signal that changes the orientation of the image capture means relative to the UAV in order to direct the image capture means toward at least some of the obscured portions of the vehicle that are obscured from the line of sight of the vehicle user.

Optionally, the processor is arranged to generate a control signal to control the position of the UAV.

Optionally, the processor is arranged to generate a control signal to keep the UAV on the opposite side of vehicle to the vehicle user. The controller may be arranged to track movement of the user device and to generate a control signal to fly the UAV to a position that is substantially on the opposite side of the vehicle to the user device.

Optionally, the inputs are arranged to receive vehicle sensor data relating to the proximity of the vehicle to an object and the processor is arranged to generate a control signal for the UAV such that the image data captured by the image capture means comprises a portion of the vehicle in proximity to the object. In this manner images of portions of the vehicle that are not within the field of view of the user including potential objects that the vehicle might collide with may be captured.

The processor may be arranged to generate a control signal to control the UAV to maintain its position within a predetermined range of the vehicle.

The processor may be arranged to generate a control signal to control the UAV to maintain its height from the ground within a predetermined range. The controller may be arranged to generate a control signal to control the UAV such that image data captured by the image capture means provides a "bird's eye view" of the vehicle. The UAV may vary its height/distance in the event that a potential collision is determined (i.e. onboard processors within the UAV may vary the height/distance instructed by the controller in the event that the UAV detects a potential collision).

The processor may be arranged to run a location calibration process to correct or minimise errors in positional data received from the user device, vehicle or UAV. The location calibration process may comprise instructing the vehicle user to position the user device at a specific location relative to the vehicle. For example, the controller could inform the user to stand in front of the vehicle between the headlights and then compare the received positional data from the user device with the known location that the user device has been positioned at. GPS errors may be corrected in this manner. The UAV position may be corrected using INS methods as described above.

The location calibration process may also/alternatively comprise instructing the UAV to position itself at a specific location relative to the vehicle. For example, the controller may instruct the UAV to fly to a specific point, e.g. aligned with mid point of rear numberplate at a given height and distance from vehicle, and then controller may determine the actual location of the UAV from vehicle sensor data in order to determine errors in positional data.

Optionally, image data is output to the user device for display on a display screen of the user device.

Optionally, the processor is arranged to generate a driving control signal for maneuvering the vehicle and the output is arranged to output the driving control signal to the vehicle.

The present invention extends to an unmanned aerial vehicle comprising a controller as described in the above aspect of the invention and also extends to a vehicle comprising a controller as described in relation to the above aspect of the invention.

The present invention extends to a remote control device for remotely controlling a vehicle comprising a controller as described above. The present invention extends to a user device comprising such a remote control device.

According to another aspect of the present invention there is provided a method of controlling an unmanned aerial vehicle, UAV, comprising an image capture means, the method comprising: receiving positional data relating to the UAV, a vehicle and a user device; image data captured by the image capture means; processing at a processor the received positional data to determine the relative locations of the UAV, vehicle and user device; outputting a control signal for controlling the UAV and outputting an image signal comprising captured image data; wherein the processor generates the control signal for the UAV such that the image data captured by the image capture means comprises at least some of the obscured portions of the vehicle that are obscured from the line of sight of the vehicle user.

The invention extends to a computer program product comprising instructions which, when the program is executed by a computer, cause the computer to carry out the above method and to a computer-readable storage medium comprising instructions which, when executed by a computer, cause the computer to carry out the above method.

A system for as described above, wherein the input for receiving positional data and image data comprises an electronic processor having an electrical input for receiving one or more signals carrying said data and the processor is configured to access the memory device and execute the instructions stored therein such that it is operable to generate a control signal for controlling the unmanned aerial vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 2:
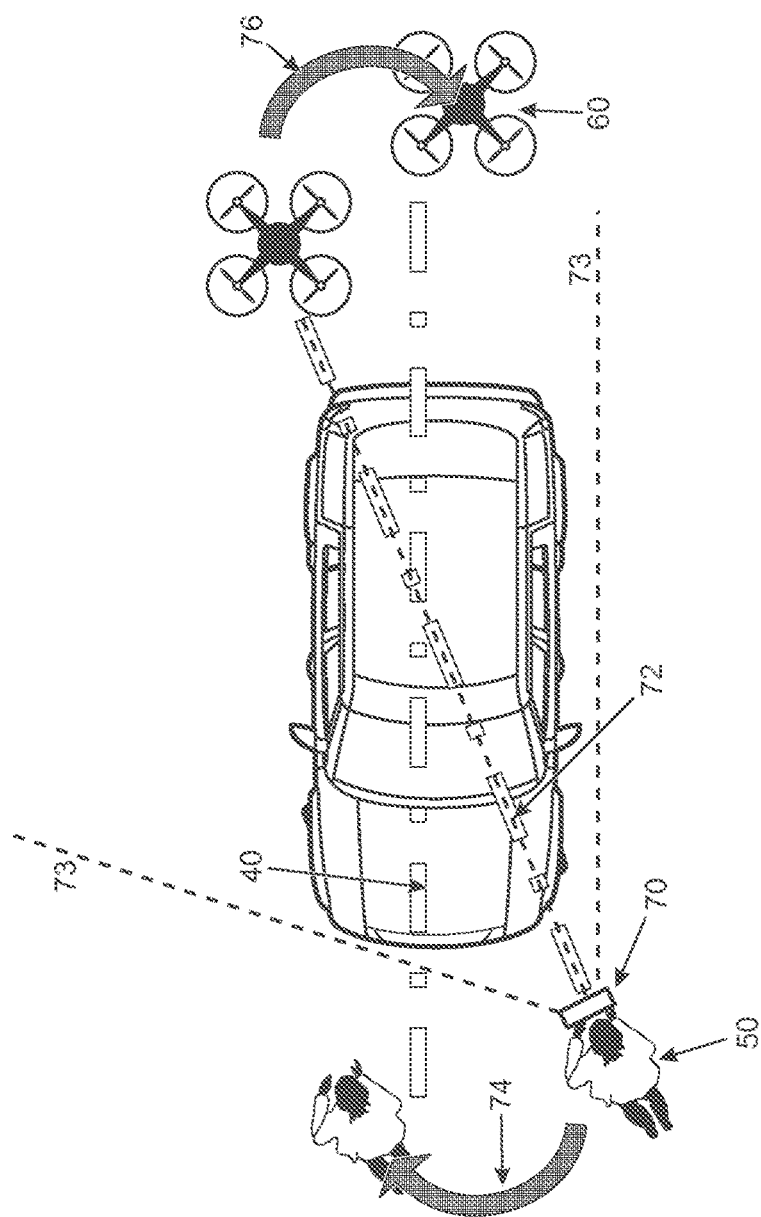
FIG. 2 shows a remote control system in accordance with an embodiment of the present invention.
Figure 1:
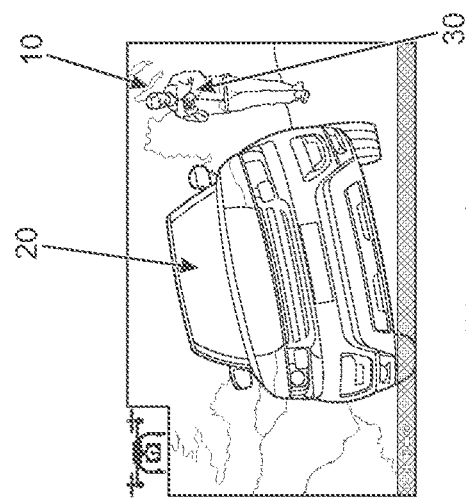
FIG. 1 shows a known remote control system for a vehicle.

FIG. 2 shows a remote control system for a vehicle 40 in accordance with an embodiment of the present invention in which a vehicle user 50 is provided with images from an unmanned aerial vehicle/drone 60. It is noted that the terms unmanned aerial vehicle (UAV) and drone are regarded as interchangeable.

The drone 60 comprises an embedded image capture means such as a camera (not shown in FIG. 2) which can be used to send images to a user device 70, such as a smartphone. The user device 70 is arranged to enable the user 50 to control the steering, throttle and braking systems of the vehicle 40 such that the vehicle can be remotely controlled.

As described below the drone may be controlled to fly around the vehicle 40 and to maintain a hovering position that is generally opposite the vehicle user's position such that the embedded camera can provide images (to the device 70) of the portions of the vehicle 40 that the driver cannot see because the vehicle is obstructing them.

A line of sight 72 of the vehicle user 50 is shown in FIG. 2. User movement 74 and drone movement 76 are indicated in FIG. 2 and it can be seen that the drone 60 maintains a position that is generally on the opposite side of the vehicle 40 to the user 50.

Figure 3:
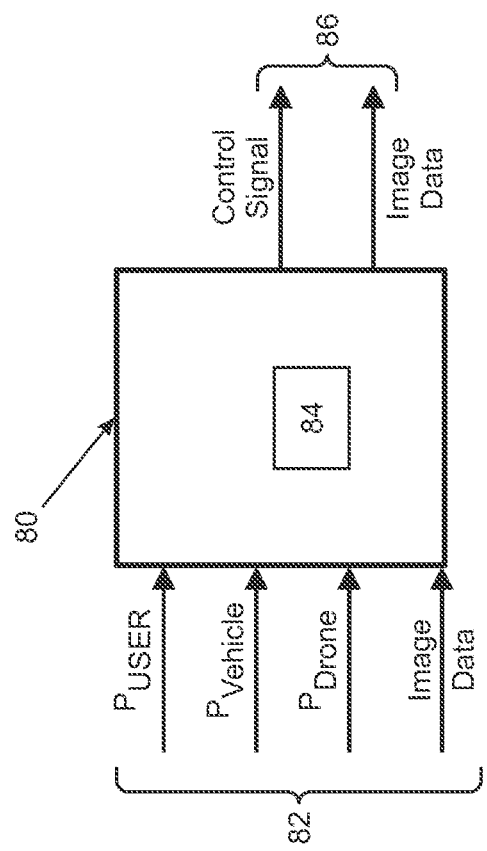
FIG. 3 shows a controller in accordance with an embodiment of the present invention.

FIG. 3 shows a controller 80 in accordance with an embodiment of the present invention for an unmanned aerial vehicle 60, the controller comprising inputs 82 for receiving positional data relating to the vehicle 40, the vehicle user 70 and the drone 60 and also for receiving image data captured by the image capture means of the drone 60. The controller 80 further comprises a processor 84 for determining the relative locations of the vehicle, user and drone from the received positional data and for generating a control signal for the drone 60. Outputs 86 output a control signal to the drone 60 and image data to the user device 70.

The processor is arranged to generate the drone control signal such that the image data captured by the image capture means comprises at least some of the obscured portions of the vehicle 40 that are obscured from the line of sight 72/field of view 73 of the vehicle user 50.

It is noted that the image capture device may be fixed relative to the drone 60 in which case the control signal for the drone 60 may comprise a flight related control signal only. Alternatively, the image capture device may be moveable relative to the drone 60 in which case the control signal for the drone 60 may additionally comprise a directional control signal for the image capture device in addition to a flight related control signal.

The controller 80 is a computing device that can comprise a control unit or computational device having one or more electronic processors (e.g., a microprocessor, a microcontroller, an application specific integrated circuit (ASIC), etc.), and may comprise a single device or multiple devices that collectively operate as the controller 80. The term "controller," "control unit," or "computational device" may include a single controller, control unit, or computational device, and a plurality of controllers, control units, or computational devices collectively operating to provide the required control functionality. A set of instructions is provided in some embodiments which, when executed, cause the controller to implement the control techniques mentioned in this description (including some or all of the functionality required for the described method). The set of instructions could be embedded in one or more electronic processors of the computing device; or alternatively, the set of instructions could be provided as software to be executed in the computing device. Given this description those skilled in the art will realize what type of hardware, software, firmware, or a combination of these will best suit their particular needs. It is noted that in embodiments of the present invention the controller 80 may be located within the vehicle, the drone or the user device. For example, the controller may be located in the user device and receive inputs from the drone and the vehicle and then generate control signals to be sent to the drone. Alternatively, the controller 80 might be located within the vehicle (or the drone) and receive inputs from the user device (the user device in this instance essentially operating as a remote peripheral device to the controller).

Figure 4:
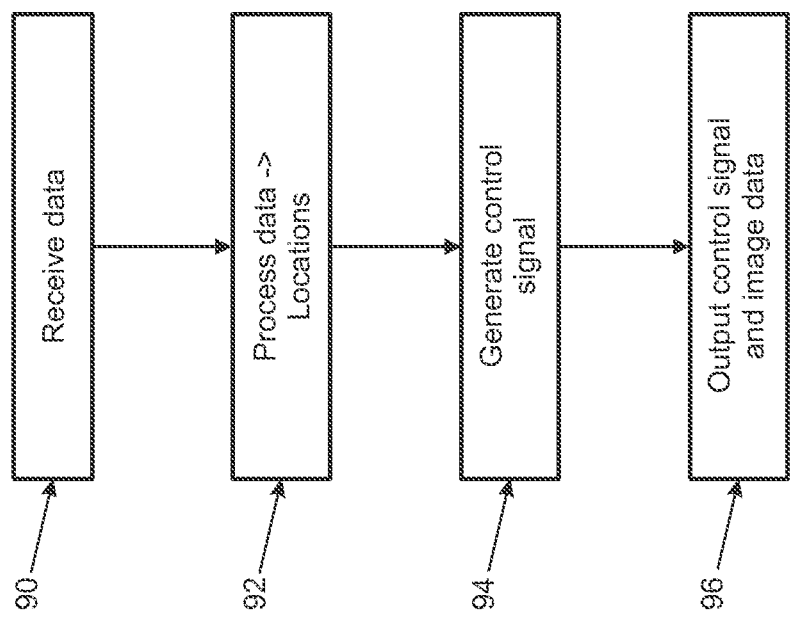
FIG. 4 shows a method of operating a controller according to FIG. 3.

FIG. 4 shows a method of operating the controller of FIG. 3 in accordance with an embodiment of the present invention.

In Step 90 positional and image data is received at the inputs 82 of the controller. In step 92 the processor 84 determines the relative positions of the user 50, vehicle 40 and drone 60. In step 94 the processor is arranged to generate a control signal for the drone 60 such that the drone will be commanded to take up a position such that the vehicle 40 is between the drone 60 and the user 50. In step 96 the control signal is output to the drone 60 and image data is output to the user device 70 via the outputs 86.

Figure 5:
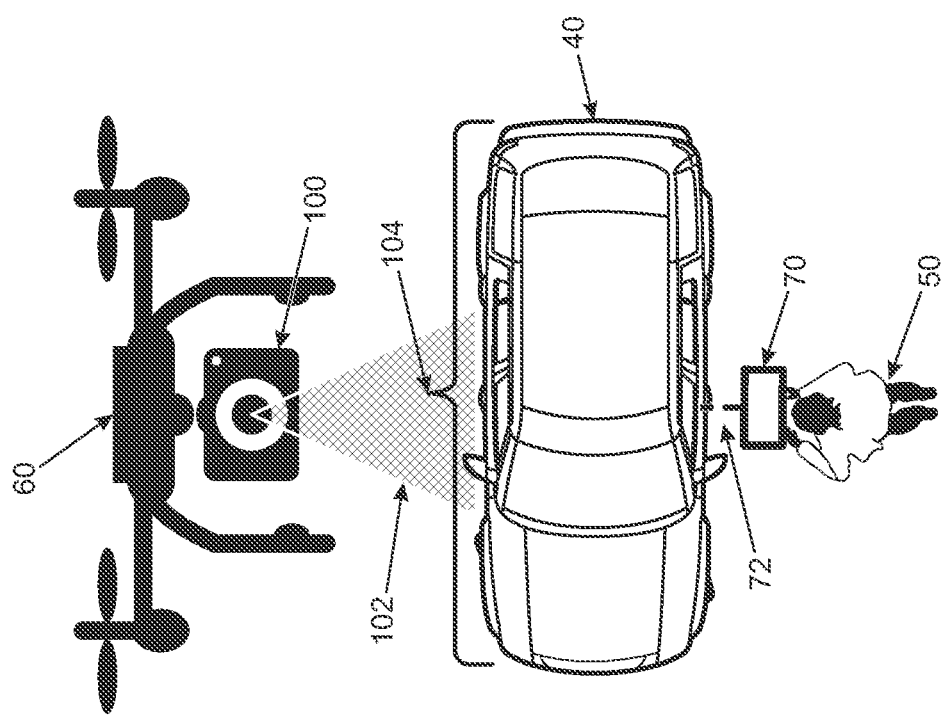
FIG. 5 shows a vehicle, vehicle user and UAV in accordance with an embodiment of the present invention.

FIG. 5 shows a further view of the arrangement shown in FIG. 2. The image capture means 100 of the drone 60 is visible in FIG. 5 along with the field of view 102 of the image capture device 100. It can be seen that region 104 of the vehicle 40 is not visible to the user 50 as the vehicle 40 is blocking their line of sight 72. The drone 60 however may capture image data of at least part of the obstructed part of the vehicle 4 and this may be relayed via the controller 80 to the user device 70. In this manner, the user 50 may monitor the obstructed region 104 of the vehicle 40 while controlling the vehicle.

Figure 6:
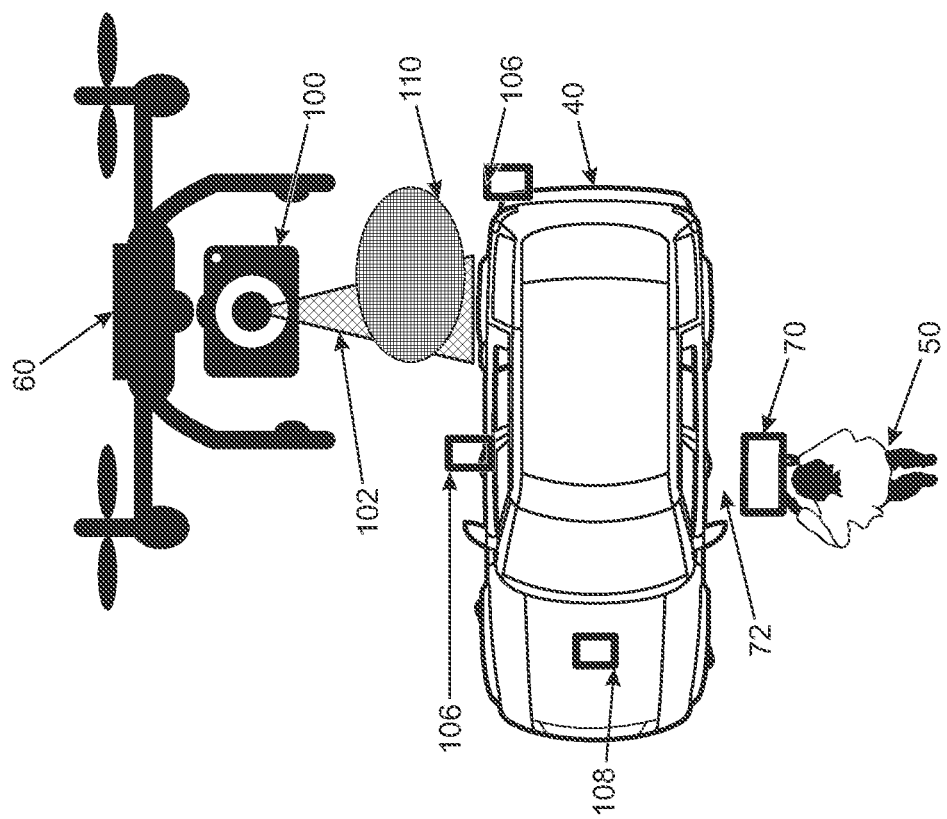
FIG. 6 shows a further view of a vehicle, vehicle user and UAV in accordance with an embodiment of the present invention.

Turning to FIG. 6 it is noted that the vehicle 40 may comprise a number of sensor means 106 such as ultrasonic sensors, surround image capture means etc. Such sensor means 106 may be used by an electronic control unit 108 within the vehicle 50 to detect potential collisions with objects 110 in the vicinity of the vehicle 50. Such collision related data may be relayed to the controller 80 such that the drone 60 may be controlled to direct the image capture device 100 such that the object 110 falls within the field of view of the camera 100. The control signal output from the outputs 86 may therefore control the drone 60 to orientate itself such that the object 110 is in the field of view of the camera 100. Additionally or alternatively the camera 100 may zoom in on the object 110 so that the zoomed image data may be provided to the user device 70 to aid the user 50 control the vehicle 40.

It is noted that the vehicle 40 may additionally provide image data from image capture means 106 to the inputs 82 of the controller 80. The controller may further either output the image data from the image capture means 106 to the user device 70 or additionally provide the user 50 with a choice to view such image data. Image data from the vehicle 50 may be displayed side by side or above/below with image data from the drone 60 or may be displayed in a "picture in picture" format. In alternative arrangements the image data from the drone 60 could be output to a wearable device such as virtual reality glasses in order to provide a first person view to the vehicle user 50.

Figure 7:
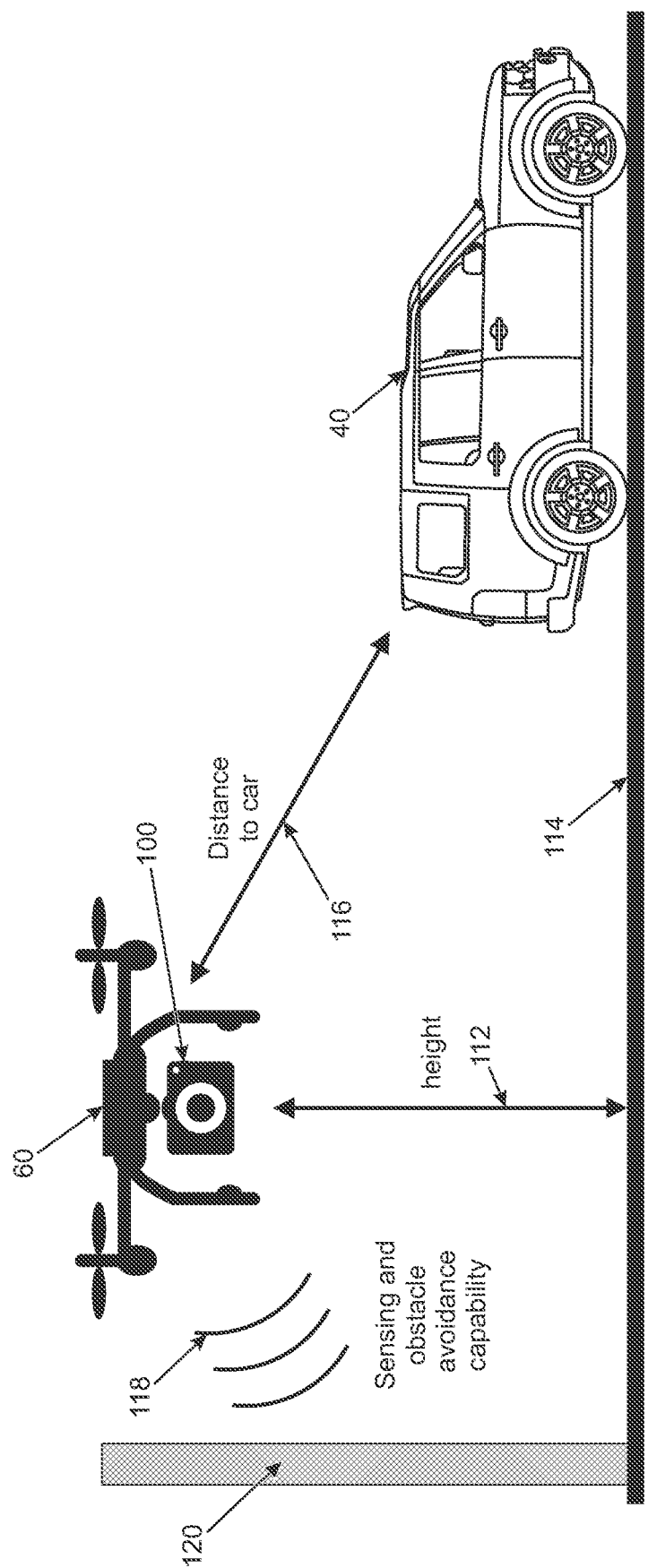
FIG. 7 shows a still further view of a vehicle, vehicle user and UAV in accordance with an embodiment of the present invention.

As shown in FIG. 7, the drone may be configured with a default value of the height 112 that it is to fly above ground level 114 and a default value of the distance 116 that it is to fly from the vehicle 40. The default height 112 and distance 116 values may be input to the controller 80 either from the user device 70 or a control interface within the vehicle 40. The controller may also be arranged to suggest suitable default values 112, 116 to the user 50.

In the event that the drone 60 senses 118 an obstacle 120 while operating to the default height 112 and distance 116 values then the drone may modify the default values in order to avoid a collision. Such modified values may be related to the controller 80.

Figure 8:
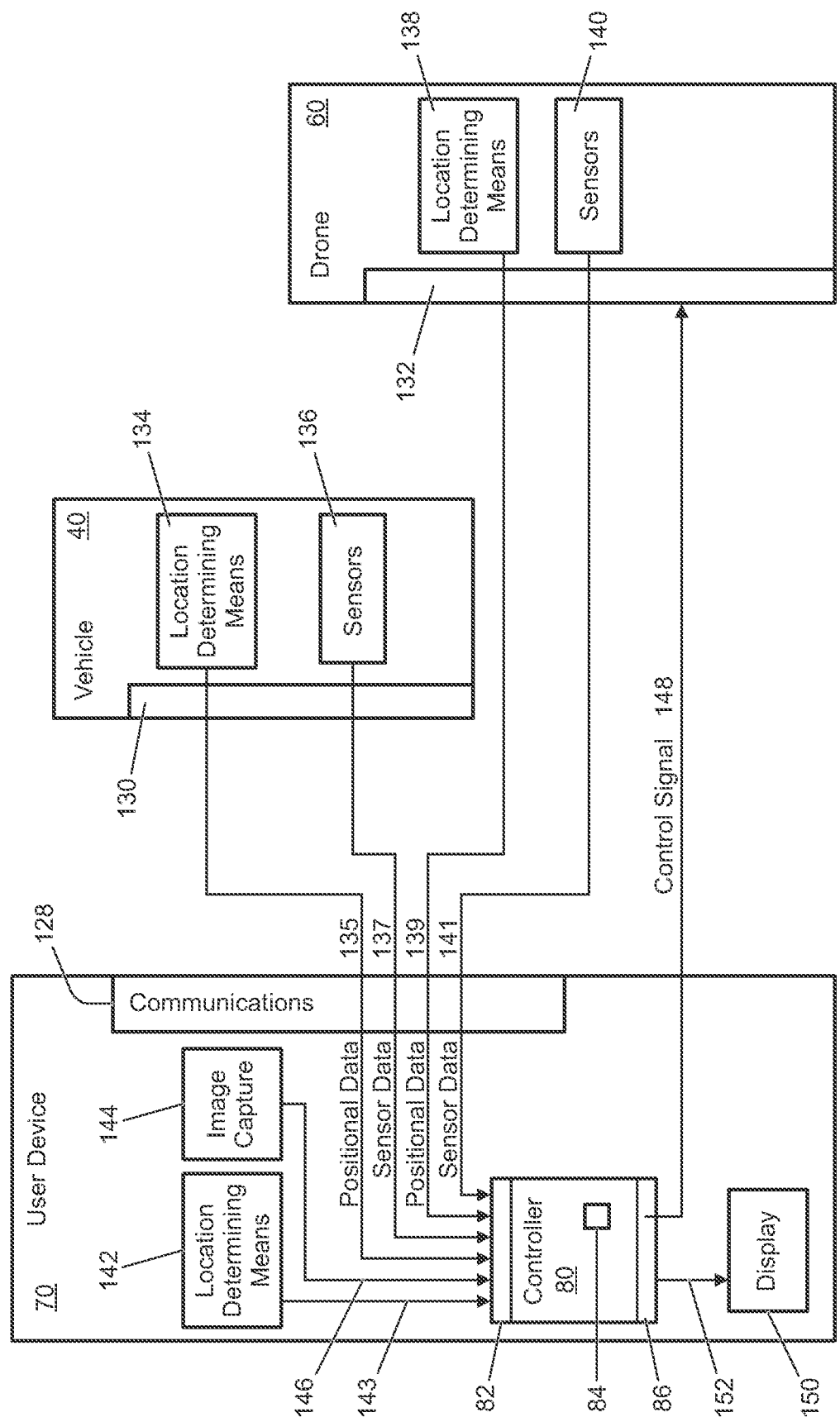
FIG. 8 shows data exchanged between a vehicle, user device and UAV in accordance with an embodiment of the present invention.

FIG. 8 shows a flow chart of data that may be exchanged between the vehicle 40, drone 60 and user device 70. It is noted that not all data exchanges shown in FIG. 8 may be needed and the specific data required will be dependent on the specific environment that the drone 60 is being deployed in. Data may be exchanged between the devices according to any suitable wireless communications technology 128 such as Wi-Fi®, Bluetooth®, Radio transmissions, mobile communications signals etc.).

In FIG. 8 the controller 80 is located within the user device 70. It is noted however that the controller may alternatively be embedded within the vehicle 40 or the drone 60 itself. If the controller was located within the vehicle 40 or drone 60 it is noted that the direction of certain data exchanges may be different but the overall functionality of the system would be the same.

Returning to FIG. 8 it is noted that that each device (40, 60, 70) comprises a communications means 128, 130, 132. In practice it is noted that each device may comprise a number of different communications options, e.g. Wifi® module, Bluetooth® module, radio etc. It is noted that the specific communications technology used to communicate with the controller 80 may vary depending on circumstances. It is further noted that different devices may use different communications technologies, e.g. the vehicle 40 may communicate over Bluetooth® with the controller 80 whereas the drone 60 may communicate over a Wifi® connection with the controller 80.

The vehicle 40 comprises a location determining means 134. In practice the vehicle may comprise a number of methods for determining its location, e.g. via a GPS system, a simultaneous localization and mapping (SLAM) algorithm and/or an inertial navigation system. One or more of such systems are arranged to output positional data 135 via the vehicle communication means 130 to the controller 80 (such data being received at the controller inputs 82 via the communication means 128 of the user device 70).

The vehicle 40 comprises a number of sensors 136 for example radar, ultrasonic sensors, lidar, image capture devices etc. The vehicle 40 may further supply sensor related data 137 via the vehicle communication means 130 to the controller 80.

The drone 60 comprises a location determining means 138. In practice the drone may comprise a number of methods for determining its location, e.g. via a GPS system, a simultaneous localization and mapping (SLAM) algorithm and/or an inertial navigation system. One or more of such systems are arranged to output positional data 139 via the drone communication means 132 to the controller 80 (such data being received at the controller inputs 82 via the communication means 128 of the user device 70).

The drone 60 comprises a number of sensors 140 for example radar, ultrasonic sensors, lidar, image capture devices etc. The drone 60 may further supply sensor related data 141 via the drone communication means 132 to the controller 80. In particular, the drone 60 may supply image data from an image capture means 100 to the controller 80.

The user device 70 also comprises a location determining means 142. In practice, the user device may comprise a number of methods for determining its location, e.g. via a GPS system, a simultaneous localization and mapping (SLAM) algorithm and/or an inertial navigation system. One or more of such systems are arranged to output positional data 143 to the controller 80. The user device may also comprise an image capture means 144 which may send image data 146 to the controller 80.

The data received at the controller 80 may be used to generate a control signal 148 for the drone 60 as described above in relation to FIG. 4. This control signal may be output via the outputs 86 to the drone.

The user device 70 further comprises a display screen 150 and the controller 80 additionally outputs a control signal 152 to the display screen, the control signal 152 including image data received from the image capture means 100 of the drone 60.

The controller may be further configured to allow the vehicle user to manoeuvre the vehicle (by outputting suitable driving control signals) while they are outside the vehicle via a suitable control interface on the user device. By providing image data from the drone 60 to the display screen of the user device 70, the user is able to both manoeuvre the vehicle and also assess and avoid obstacles that are outside their field of view 73/line of sight 72.

Figure 9:
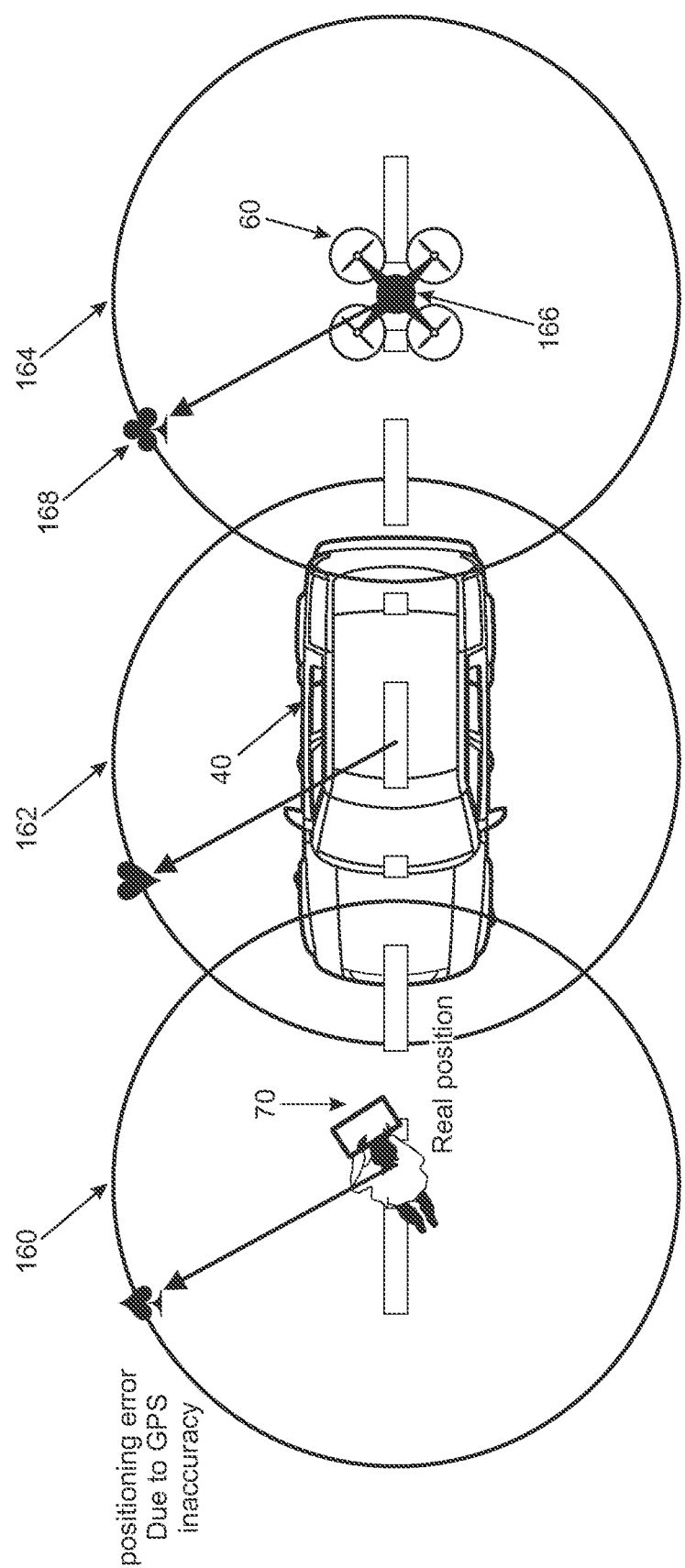
FIG. 9 shows positioning errors for a vehicle, user device and UAV.

FIG. 9 shows the positioning errors that may be associated with the various devices (40, 60, 70) and the correction of such positioning errors in accordance with an embodiment of the present invention.

In FIG. 9 the user device 70, vehicle 40 and drone 60 are all equipped with a GPS system. The user device 70 is associated with a GPS positioning error as indicated by circle 160. The vehicle 40 is associated with a GPS positioning error as indicated by circle 162 and the drone 60 is associated with a GPS positioning error as indicated by circle 164.

The controller 80 may send a control signal 148 to the drone 60 to take up a position 166 directly behind the vehicle 40. Due to the GPS positioning error however the drone 60 may take up position at location 168 as indicated in FIG. 9.

The drone 60 may be arranged to detect and correct for the positioning error between locations 166 and 168 in a number of ways. In the event that the drone takes off from a location in or on the vehicle 40 then an inertial navigation system within the drone 60 may detect the positioning error between locations 166 and 168. Additionally or alternatively a time of flight measurement may be made between the vehicle 40 and the drone 60 from which the drone can determine the positioning error. Additionally or alternatively a pattern matching method may be used on image data captured by the image capture means 100 of the drone 60 to identify features on the vehicle 40. The positioning error may be determined by identifying specific features on the vehicle, such as the roof of the vehicle or the wheels of the vehicle, and adjusting the position of the drone 60.

The controller 80 may initiate a positioning calibration step in which the user 50 is directed to take up a certain position relative to the vehicle 40. For example, the user may be requested to stand with the user device 70 directly in front of the vehicle 40. The drone 60 may then be sent a control signal 148 to take up position directly behind the vehicle 40 based on the GPS data received from the drone 60. A calibration process may then be initiated in which any GPS positioning errors are compensated for using any of the methods described above, e.g. using inertial navigation system data from the drone 60, using time of flight measurements between the drone 60 and vehicle 40, using pattern matching methods to determine a relative location of the drone and vehicle.

Once the positioning error is known the drone 60 may correct for the error by moving to location 166. The correction applied to its position may be supplied to both the user device 70 and the vehicle 40 so that they can correct for similar GPS positioning errors. The correction to the position of the drone 60 may be supplied directly between the user device 70, drone 60 and vehicle 40. Alternatively, the drone may inform the controller 80 which then updates the locations of the user device 70 and vehicle 40.

Many modifications may be made to the above examples without departing from the scope of the present invention as defined in the accompanying claims.

The invention claimed is:

1. A controller for an unmanned aerial vehicle (UAV) comprising an image capture means, the controller comprising:
   inputs arranged to receive: positional data relating to the UAV, a vehicle and a user device; and image data captured by the image capture means;
   a processor arranged to process the received positional data to determine relative locations of the UAV, vehicle and user device; and
   an output arranged to output a control signal for controlling the UAV and to output an image signal comprising captured image data;
   wherein the processor is arranged to:
   determine obscured portions of the vehicle that are obscured from a direct line of sight from a user of the user device based at least in part on the determined relative location of the vehicle and the user device; and
   generate the control signal for the UAV such that the image data captured by the image capture means comprises at least an image of the determined obscured portions of the vehicle.

2. A method of controlling an unmanned aerial vehicle (UAV) comprising an image capture means, the method comprising:
   receiving positional data relating to the UAV, a vehicle and a user device; image data captured by the image capture means;
   processing at a processor the received positional data to determine the relative locations of the UAV, vehicle and user device;
   outputting a control signal for controlling the UAV and outputting an image signal comprising captured image data;
   determining obscured portions of the vehicle that are obscured from a direct line of sight from a user of the user device based at least in part on the determined relative location of the vehicle and the user device;
   wherein the processor generates the control signal for the UAV such that the image data captured by the image capture means comprises at least an image of the determined obscured portions of the vehicle.

3. The controller as claimed in claim 1, wherein UAV positional data comprises data from an inertial navigation system on the UAV.

4. The controller as claimed in claim 3, wherein the processor is arranged to use positional data from the UAV inertial navigation system to correct GPS positioning errors.

5. The controller as claimed in claim 1, wherein positional data comprises time of flight measurement data between one or more of: the UAV/vehicle; the UAV/user device; vehicle/user device.

6. The controller as claimed in claim 5, wherein the inputs are arranged to receive vehicle sensor data and the processor is arranged to determine relative locations of the UAV, vehicle and user or user device from the vehicle sensor data and time of flight measurement data.

7. The controller as claimed in claim 1, wherein the positional data received at the inputs comprises data from a vehicle entry system.

8. The controller as claimed in claim 1, wherein the processor is arranged to use an image recognition algorithm to determine the relative location of the vehicle user and vehicle from image data received from the image capture means.

9. The controller as claimed in claim 1, wherein the processor is arranged to generate a control signal to control the UAV position such that the image capture means is directed toward at least some of the obscured portions of the vehicle that are obscured from the line of sight of the vehicle user.

10. The controller as claimed in claim 1, wherein the processor is arranged to generate a control signal that changes the orientation of the image capture means relative to the UAV in order to direct the image capture means toward at least some of the obscured portions of the vehicle that are obscured from the line of sight of the vehicle user.

11. The controller as claimed in claim 1, wherein the processor is arranged to generate a control signal to control the position of the UAV.

12. The controller as claimed in claim 1, wherein the inputs are arranged to receive vehicle sensor data relating to the proximity of the vehicle to an object and the processor is arranged to generate a control signal for the UAV such that the image data captured by the image capture means comprises a portion of the vehicle in proximity to the object.

13. The controller as claimed in claim 1, wherein image data is output to the user device for display on a display screen of the user device.

14. The controller as claimed in claim 1, wherein the processor is arranged to generate a driving control signal for manoeuvring the vehicle and the output is arranged to output the driving control signal to the vehicle.

15. An unmanned aerial vehicle comprising the controller as claimed in claim 1.

16. A vehicle comprising the controller as claimed in claim 1.

17. A remote control device for remotely controlling a vehicle comprising the controller as claimed in claim 1.

18. A non-transitory computer-readable medium having stored thereon instructions that, when executed by a processing device, cause the processing device to carry out the method of claim 2.

* * * * *